(12) United States Patent
Garavaglia et al.

(10) Patent No.: US 8,794,836 B2
(45) Date of Patent: Aug. 5, 2014

(54) EASY-OPEN HEAT-SHRINKABLE PACKAGING ARTICLE AND PACKAGE MADE THEREFROM

(75) Inventors: Daniela Garavaglia, Ineruno (IT); Tiziano Scapoli, Sumirago (IT); Massimo Alquati, Arese (IT)

(73) Assignee: Cryovac, Inc., Duncan, SC (US)

( * ) Notice: Subject to any disclaimer, the term of this patent is extended or adjusted under 35 U.S.C. 154(b) by 350 days.

(21) Appl. No.: 13/271,362

(22) Filed: Oct. 12, 2011

(65) Prior Publication Data

US 2013/0094790 A1    Apr. 18, 2013

(51) Int. Cl.
*B65D 33/00* (2006.01)
*B65D 65/26* (2006.01)

(52) U.S. Cl.
USPC ............ 383/200; 383/906; 383/127; 383/207

(58) Field of Classification Search
USPC .......... 383/127, 200, 203, 204, 207–209, 906
See application file for complete search history.

(56) References Cited

U.S. PATENT DOCUMENTS

| | | | |
|---|---|---|---|
| 2,093,974 A * | 9/1937 | Farmer | 383/90 |
| 2,296,387 A | 9/1942 | Inskeep et al. | |
| 2,952,394 A * | 9/1960 | Schneider | 229/113 |
| 3,051,368 A * | 8/1962 | Schneider et al. | 383/209 |
| 3,397,835 A * | 8/1968 | Henning | 383/208 |
| 3,516,537 A | 6/1970 | Dreyfus et al. | |
| 4,229,244 A | 10/1980 | Swope | |
| 4,278,738 A | 7/1981 | Brax et al. | |
| 4,553,971 A | 11/1985 | Ashley et al. | |
| 5,222,813 A | 6/1993 | Kopp et al. | |
| 5,417,035 A | 5/1995 | English | |
| 5,445,454 A | 8/1995 | Barkhorn | |
| 5,512,337 A | 4/1996 | Littmann et al. | |
| 5,593,229 A | 1/1997 | Warr | |
| 6,352,364 B1 * | 3/2002 | Mobs | 383/200 |
| 6,499,598 B2 | 12/2002 | Montepiani et al. | |
| 6,610,392 B1 | 8/2003 | Ramesh et al. | |
| 7,207,157 B2 | 4/2007 | Wolf et al. | |
| 7,262,389 B2 | 8/2007 | Irwin et al. | |
| 2001/0025803 A1 | 10/2001 | Montepiani et al. | |

(Continued)

OTHER PUBLICATIONS

ASTM D 1922-09, Standard Test Method for Propagation Tear Resistance of Plastic Film and Thin Sheeting by Pendulum Method, TAPPI, May 1, 2009, 7 pages.

(Continued)

*Primary Examiner* — Jes F Pascua
*Assistant Examiner* — Peter Helvey
(74) *Attorney, Agent, or Firm* — Rupert B. Hurley, Jr.

(57) ABSTRACT

A packaging article comprises a heat-shrinkable multilayer film having a first heat seal running the length of the article and a second heat seal running across the bottom of the internal volume of the article. The packaging article also comprises a skirt outward of the second heat seal, the skirt having first and second tear initiators positioned so that a superimposed straight line extending through the inward and outward ends of each tear initiator intersects a superimposed straight line extending through the ends of the first heat seal at a lesser included angle of from 25 degrees to 55 degrees, with the inward end of each the first and second tear initiators terminating at a location which is from 3 to 30 millimeters from the first heat seal and 3 to 50 millimeters from the second heat seal.

20 Claims, 10 Drawing Sheets

(56) References Cited

U.S. PATENT DOCUMENTS

| | | | |
|---|---|---|---|
| 2002/0191870 A1* | 12/2002 | Richison et al. | 383/63 |
| 2005/0031232 A1* | 2/2005 | Jammet et al. | 383/200 |
| 2006/0177162 A1 | 8/2006 | Harano et al. | |
| 2006/0188182 A1* | 8/2006 | Moteki et al. | 383/200 |
| 2007/0227102 A1 | 10/2007 | Prataiola | |
| 2008/0285896 A1 | 11/2008 | Taheri | |
| 2008/0292225 A1 | 11/2008 | Dayrit et al. | |
| 2008/0292821 A1 | 11/2008 | Dayrit et al. | |
| 2009/0074333 A1 | 3/2009 | Griebel et al. | |
| 2009/0116768 A1 | 5/2009 | Huerta et al. | |
| 2009/0161995 A1 | 6/2009 | Henderson et al. | |
| 2010/0183830 A1 | 7/2010 | Berbert | |
| 2011/0084077 A1 | 4/2011 | James et al. | |
| 2011/0104342 A1 | 5/2011 | Glaser et al. | |

OTHER PUBLICATIONS

ASTM D 3763-95A, Standard Test Method for High Speed Puncture properties of Plastics Using load and Displacement Sensors, American Society for Testing Materials, Nov. 10, 1995, 6 pages.

ASTM D 2732, Standard Test Method for Unrestrained linear Thermal Shrinkage of Plastic Film and Sheeting, Aug. 10, 2003, American National Standards Institute, 5 pages.

Handbook of Food Packaging, $2^{nd}$ Ed, pp. 140-151 (1992).

Food Packaging Science and Technology, Lee et al, pp. 343-345(2008).

* cited by examiner

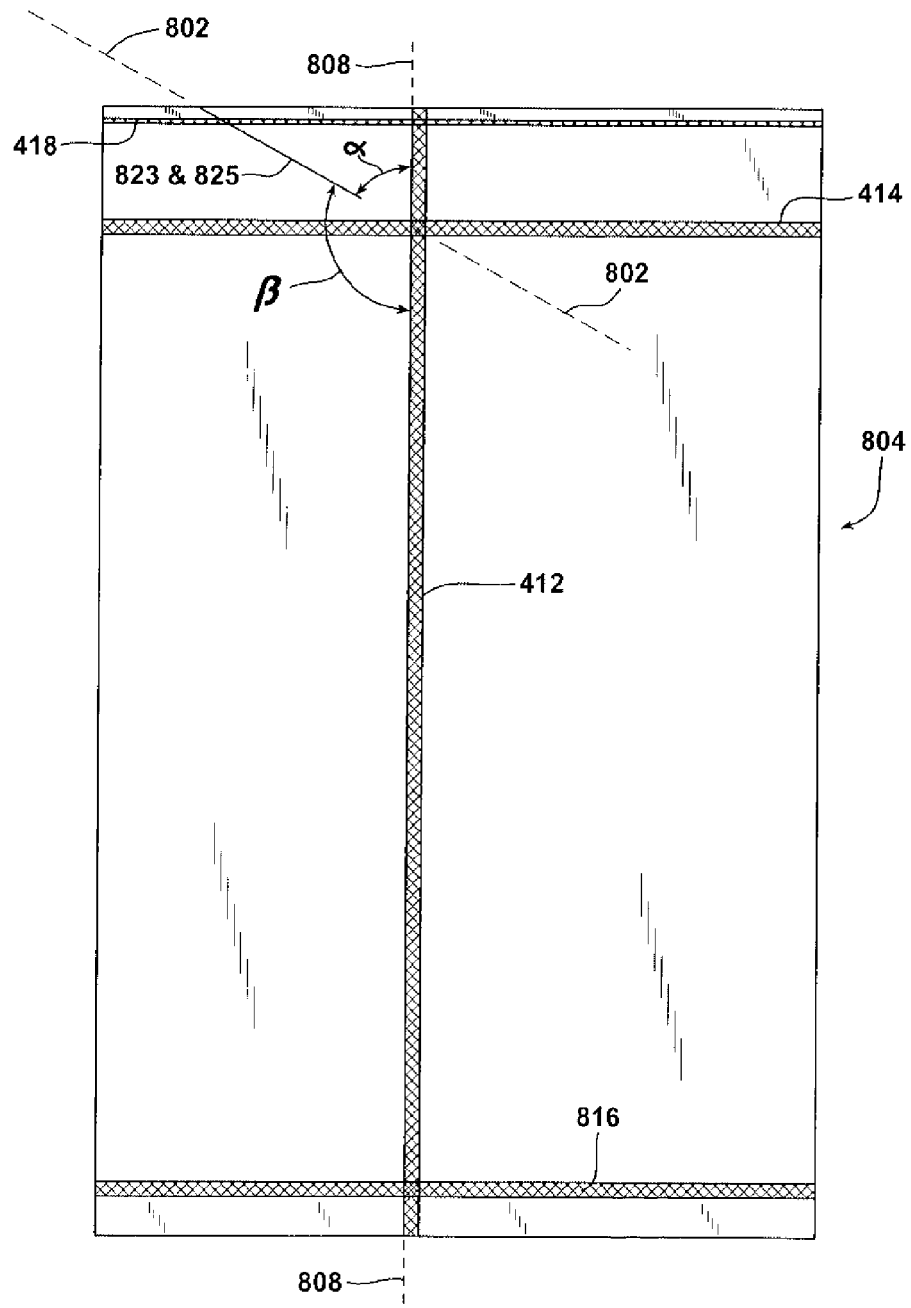
FIG. 8 (Comparative)

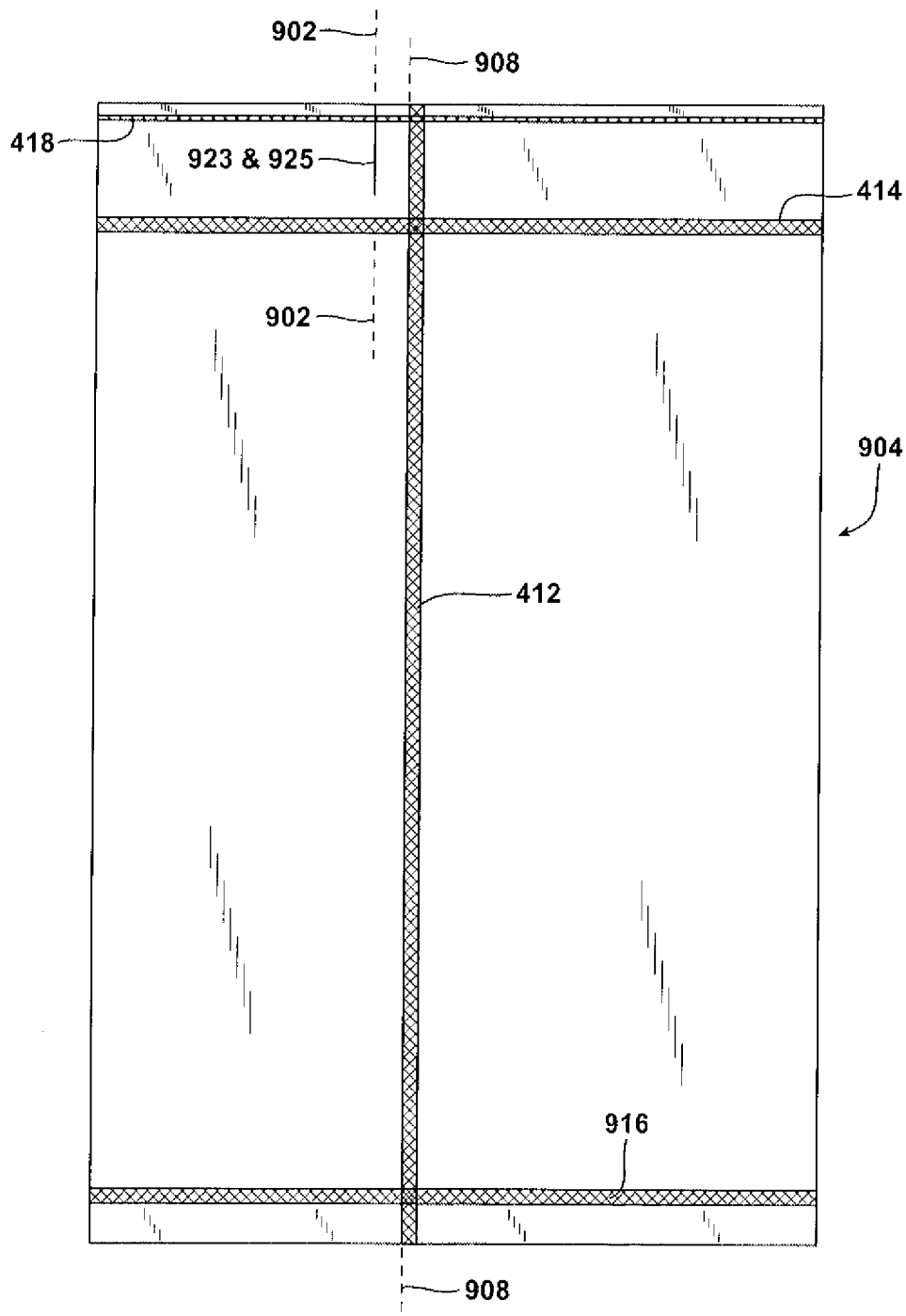
FIG. 9 (Comparative)

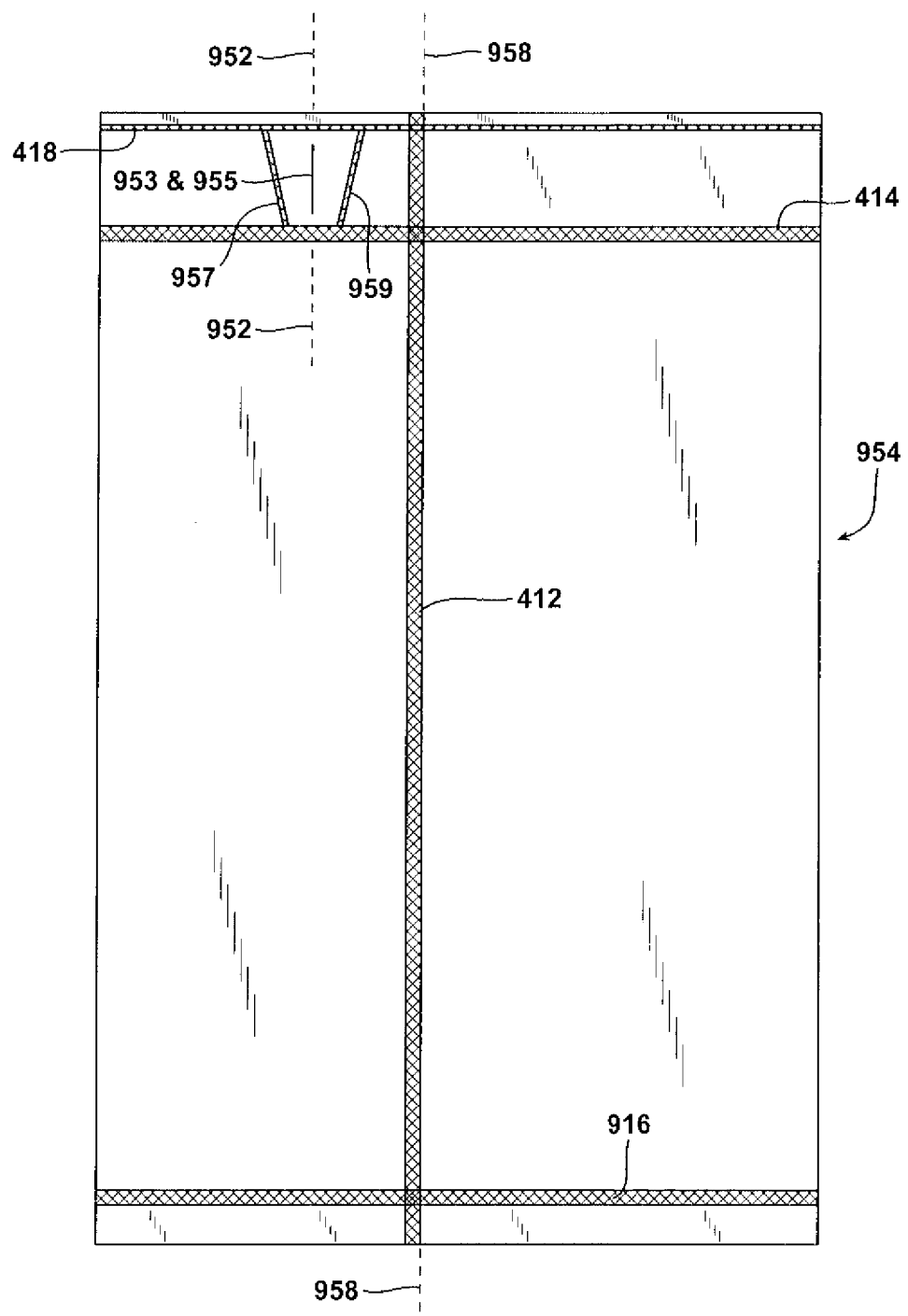
FIG. 10 (Comparative)

EASY-OPEN HEAT-SHRINKABLE PACKAGING ARTICLE AND PACKAGE MADE THEREFROM

FIELD

The present invention pertains to heat-shrinkable packaging articles that are easy to open, particularly packaging articles for food packaging end use.

BACKGROUND

Heat-shrinkable packaging articles have been used for the packaging of a variety of products. Food, particularly meat, has been vacuum packaged in such packaging articles. Heat-shrinkable packaging articles have developed higher impact strength and higher seal strength, while simultaneously becoming easier to seal, having improved oxygen and moisture barrier properties, and having higher total free shrink at lower temperatures. High seal strength, high impact strength, and high puncture-resistance are particularly important for the packaging of fresh meat products, as leaking packages are less desirable to consumers and retailers alike. Moreover, leaking packages reduce shelf life by allowing atmospheric oxygen and microbes to enter the package.

As a result, vacuum packaged products, particularly packages for vacuum packaged food, are frequently difficult to open. Typically, knives and scissors are used for opening the packaging articles that have been evacuated, sealed around, and shrunken against the food product in the package. The use of knives and scissors to open these tough packaging articles increases the risk of injury for consumers and retailers. Moreover, the opening of such tough packaging requires more time and effort due to the toughness of the shrunken packaging article, and can also result in damage to the product inside the package. The marketplace desires a tough, heat-shrinkable packaging article that can be opened quickly and easily, without the need for knives and scissors, so that the product can be easily removed from the packaging article, without damage to the product or injury to a person opening the package.

SUMMARY

The packaging article of the invention has tear initiators positioned in the article skirt, the tear initiators being in close proximity to a longitudinal heat seal. Application of manual tearing force from the tear initiators produces a tearing of the film in the machine direction along the longitudinal seal, so that the package is opened and the product readily removed from the packaging article, without the need for sharp implements to open the package, and with the use of relatively low manual force.

A first aspect is directed to a heat-shrinkable, flexible, packaging article comprising a heat-shrinkable multilayer film. The packaging article has an outside surface and an inside surface, a top edge, a bottom edge, a first longitudinal edge, a second longitudinal edge, and an internal volume for containing a product to be packaged. The packaging article further comprises a first heat seal extending along the first and second longitudinal edges from the top edge to the bottom edge down a length of the packaging article. The first heat seal is a heat seal of a first region of the inside surface to a second region of the inside surface, or a heat seal of the first region of the inside surface to a first region of the outside surface.

The packaging article further comprises a second heat seal extending across a width of the packaging article. The second heat seal provides a bottom of the internal volume within which the product is placed. The second heat seal is a heat seal of a third region of the inside surface to a fourth region of the inside surface. The second heat seal crosses (i.e., intersects) the first heat seal.

The packaging article further comprises a third heat seal that also extends across the width of the packaging article. The third heat seal provides a top of the internal volume within which the product is placed. The third heat seal is a heat seal of a fifth region of the inside surface to a sixth region of the inside surface. The third heat seal also crossing the first heat seal.

The packaging article further comprises a skirt between the second heat seal and the bottom edge. The skirt is outward of the second heat seal. The skirt has first and second tear initiators therein. The first tear initiator comprises a first cut through the skirt, and the second tear initiator comprising a second cut through the skirt. Each of the first and second tear initiators has an inward end and an outward end. The inward end is closer to both the first heat seal and the second heat seal than is the outward end. The outward end is closer to the bottom edge than is the inward end.

The first and second tear initiators are positioned relative to the first heat seal so that a superimposed straight line extending through the inward and outward ends of each tear initiator intersects a superimposed straight line extending through the ends of the first heat seal at a lesser included angle of from 25 degrees to 55 degrees. The inward end of each the first and second tear initiators terminates at a location which is from 3 to 30 millimeters from the first heat seal and 3 to 50 millimeters from the second heat seal. The heat shrinkable film exhibits an Elmendorf tear strength in a machine direction of from 0.7 Newtons to 2 Newtons before shrinking.

In an embodiment, the multilayer film is free of any score line that weakens the film along a tear line extending from the first tear initiator or along a tear line extending from the second tear initiator.

In an embodiment, the tear initiators are positioned so that a tear extending therefrom passes through the second heat seal but not through part or all of the first heat seal. In another embodiment, the tear passes through the second heat seal and the first heat seal.

In an embodiment, the second heat seal is a curved seal. For example, a transverse second heat seal that curves outwardly to provide an interior volume longest in the center of the bag is a preferred transverse seal for the packaging of products such as whole turkeys.

In an embodiment, no portion of the inside surface of the film is sealed to itself along film edges defining the first and second tear initiators. That is, the inward and outward ends of first and second tear initiators are between the second and fourth heat seals. In an embodiment, the first and second tear initiators passes through the fourth seal and to the bottom edge of the packaging article.

In an embodiment, the bottom edge of the packaging article is outward of the fourth heat seal. In another embodiment, the fourth heat seal includes the bottom edge of the packaging article.

In an embodiment, the first heat seal is located within one inch of a centerline running down the middle of the first lay-flat side of the packaging article.

In an embodiment, the first tear initiator is a curved slit and the second tear initiator is a curved slit.

In an embodiment, the first tear initiator is a notch having a first stress concentration point and the second tear initiator is a notch having a second stress concentration point.

In an embodiment, the multilayer film has a total thickness of from 0.7 to 9 mils, before shrinking In another embodiment, the multilayer film has a total thickness of from 1 to 6 mils, before shrinking In another embodiment, the multilayer film has a total thickness of from 1.5 to 4 mils, before shrinking. In another embodiment, the multilayer film has a total thickness of from 1.7 to 2.2 mils, before shrinking.

In an embodiment, the first and second heat seals intersect at ninety degrees.

In an embodiment, a superimposed straight line extending through the inward and outward ends of the first tear initiator passes through an intersection of the first heat seal and the second heat seal, a superimposed straight line extending through the inward and outward ends of the second tear initiator also passes through the intersection of the first heat seal and the second heat seal.

In an embodiment, a superimposed straight line extending through the inward and outward ends of the first tear initiator passes through the first heat seal within a distance of from 1 to 15 millimeters outward of an intersection of the first heat seal and the second heat seal, and a superimposed straight line extending through the inward and outward ends of the second tear initiator passes through the first heat seal within a distance of from 1 to 15 millimeters outward of the intersection of the first heat seal and the second heat seal.

In an embodiment, the packaging article further comprises a fourth heat seal of a seventh region of the inside surface to an eighth region of the inside surface, the forth heat seal being in the skirt.

In an embodiment, the fourth heat seal extends across a full width of the packaging article. In another embodiment, the fourth heat seal comprises at least two short heat seals each of which extends across only a portion of the width of the packaging article.

In an embodiment, the first heat seal is a heat seal of first and second regions of the inside surface to itself.

In an embodiment, the first and second tear initiators are coincident with one another.

In an embodiment, the outward ends of the first and second tear initiators are on the bottom edge of the packaging article.

In an embodiment, the first heat seal is a straight heat seal and the second heat seal is a straight heat seal.

In an embodiment, the superimposed straight line extending through the inward and outward ends of each tear initiator intersects the superimposed straight line extending through the ends of the first heat seal at a lesser included angle of from 35 degrees to 55 degrees, and the inward end of each of the first and second tear initiators terminates at a location which is from 5 to 20 millimeters from the first heat seal and 5 to 40 millimeters from the second heat seal.

In an embodiment, the superimposed straight line extending through the inward and outward ends of each tear initiator intersects the superimposed straight line extending through the ends of the first heat seal at a lesser included angle of from 40 degrees to 50 degrees, and the inward end of each of the first and second tear initiators terminates at a location which is from 7 to 15 millimeters from the first heat seal and 7 to 30 millimeters from the second heat seal.

In an embodiment, the first tear initiator is a straight slit and the second tear initiator is a straight slit. In an embodiment, the first tear initiator comprises a notch and the second tear initiator comprises a notch.

In an embodiment, the packaging article comprises an inside seal layer, an oxygen barrier layer, an outer skin layer, a first tie layer between the seal layer and the barrier layer, and a second tie layer between the barrier layer and the outer skin layer.

In another embodiment, the multilayer film comprises an inside seal layer, an oxygen barrier layer, an outside skin layer, a first tie layer between the seal layer and the barrier layer, and a second tie layer between the barrier layer and the outer skin layer.

In an embodiment, the film has a total (i.e., longitudinal plus transverse) free shrink at 85° C. of from 20 percent to 120 percent. In an embodiment, the film has a total free shrink at 85° C. of from 30 percent to 105 percent. In an embodiment, the film has a total free shrink at 85° C. of from 40 percent to 100 percent. Free shrink is measured in accordance with ASTM D 2732, which is hereby incorporated, in its entirety, by reference thereto.

In an embodiment, the first heat seal is of a first region of the inside surface to a first region of the outside surface.

In an embodiment, no layer of the multilayer film comprises an incompatible polymer blend. In another embodiment, at least one layer of the multilayer film comprises an incompatible polymer blend.

BRIEF DESCRIPTION OF THE DRAWINGS

FIG. 8 is a schematic of a first comparative packaging article in lay-flat configuration without a product inside.

FIG. 9 is a schematic of a second comparative packaging article in lay-flat configuration without a product inside.

FIG. 10 is a schematic of a third comparative packaging article in lay-flat configuration without a product inside.

DETAILED DESCRIPTION

Figure 1:
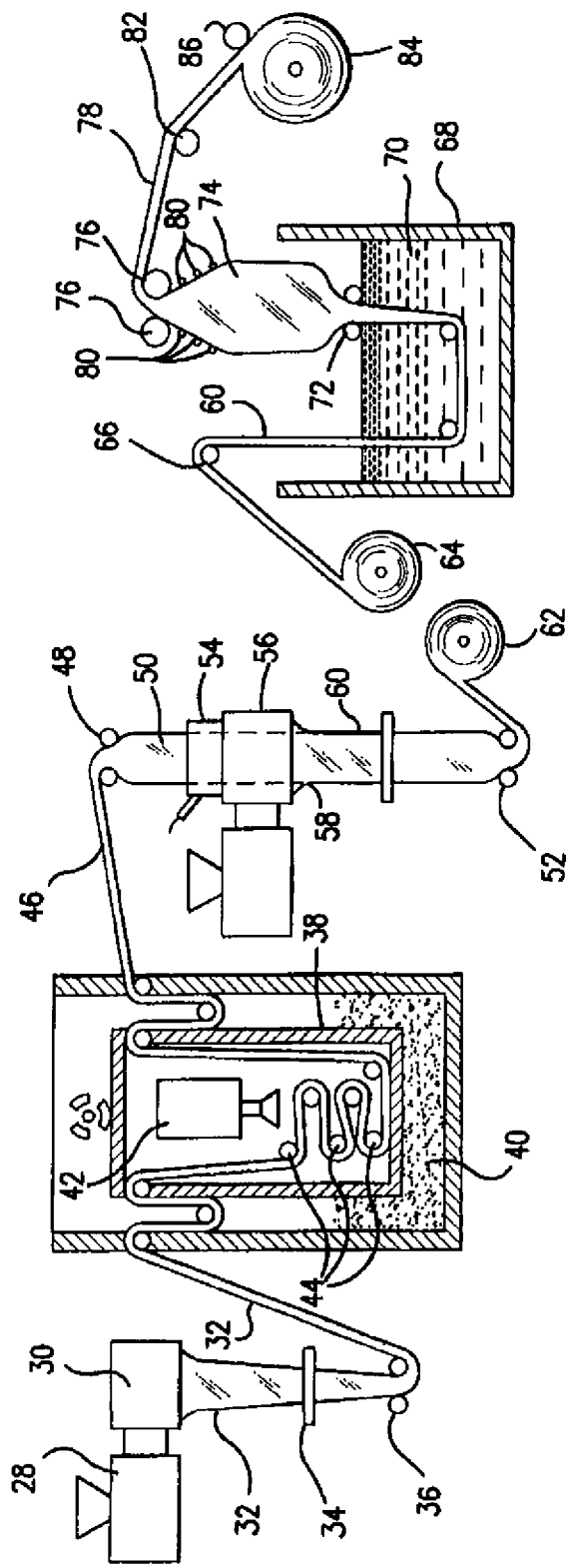
FIG. 1 is a schematic of a preferred process for making a heat-shrinkable film for use in packaging article according to the invention.

As used herein, the term "film" is inclusive of plastic web, regardless of whether it is film or sheet. The film can have a total thickness of 0.25 mm or less, or a thickness of from 1 to 10 mils, or from 1 to 5 mils, or from 1.2 mils to 3 mils, or from 1.5 to 2.5 mils.

As used herein, the term "heat seal" refers to a heat seal of a region of a first film (or a first portion of a film) to a second film (or a second portion of the film). Heat seals are generally made by applying enough heat with enough pressure for enough time to cause the regions of the films to fuse, i.e., bond, to one another. Heat seals can be made using equipment and processes such as are described in, for example Canadian Patent No. 2,296,387, US Pub. No. 2007/0227102, U.S. Pat. No. 4,229,244, and U.S. Pat. No. 7,262,389, each of which is hereby incorporated, in its entirety, by reference thereto.

As used herein, the phrase "fin seal" refers to a film-to-film heat seal of a first region of the inside surface of a flexible packaging article to a second region of the inside surface of the flexible packaging article. The film-to-film heat seal can be of a unitary piece of film to itself, or a heat seal of a first piece of film to a second piece of film.

As used herein, the phrase "lap seal" refers to a film-to-film heat seal of a region of an inside surface of a flexible packaging article to a region of an outside surface of the flexible packaging article. The film-to-film seal can be of a unitary piece of film to itself, or a heat seal of a first piece of film to a second piece of film.

As used herein, the phrase "machine direction" refers to the direction in which the film emerges from the die. Of course, this direction corresponds with the direction the extrudate is forwarded during the film production process. The phrase "machine direction" corresponds with "longitudinal direction". Machine direction and longitudinal direction are abbreviated as "MD" and "LD", respectfully. However, as used herein, the phrase "machine direction" includes not only the direction along a film that corresponds with the direction the film traveled as it passed over idler rollers in the film production process, it also includes directions that deviate up to 44 degrees from the direction the film traveled as it passed over idler rollers in the production process.

As used herein, the phrase "transverse direction" refers to a direction perpendicular to the machine direction. Transverse direction is abbreviated as "TD". The transverse direction also includes directions that deviate up to 44 degrees from the direction the film traveled as it passed over idler rollers in the production process.

The tear initiators used in the packaging article include a cut through the film. The cuts can be in the form of slits or notches. Slit-type tear initiators can be straight or curved, with or without inflection points. A slit can be continuous or present as a line of discontinuous cuts or perforations. A tear initiator can also be provided by cutting only part way through the thickness of the film, providing a line of weakness along which the remainder of the film thickness can be manually torn through. Tear initiators are to be positioned at a lesser included angle of from 25 to 55 degrees relative to the longitudinal (i.e., machine direction) first heat seal, as explained below particularly with reference to FIGS. 7, 8, and 9.

Notch-type tear initiators differ from slit-type tear initiators in that a piece of film is removed from within the notch, whereas no film is removed if a slit is made. Notches can be made from the intersection of two straight line cuts through the films, two curved line cuts through the film, or one straight-line cut and one curved-line cut. At least one of the intersecting cuts making up the notch is positioned at a lesser included angle of from 25 to 55 degrees relative to the longitudinal first heat seal.

In an embodiment, the packaging article is also provided with one or more grip assisters as described and illustrated in U.S. Ser. No. 12/313,396, published as US 2009/0116768 A1, which is hereby incorporated, in its entirety, by reference thereto.

In an embodiment, the packaging article does not have a line of weakening along a tear path emanating from the tear initiator. In this manner, the film remains strong throughout the region in which the manual tearing is to take place. In contrast to the tear path down the length of the packaging article, the one or more tear initiator, or one or more portions of the tear initiators, can comprise a line of weakness.

As used herein, tear propagation is measured according to Elmendorf Tear Strength Test—ASTM D 1922 Plastic Test Standard, which is hereby incorporated by reference, in its entirety. This test measures the average force required to propagate tearing through a specified length of plastic film.

The heat-shrinkable film can have, before shrinking, a tear propagation in a machine direction, of at least 0.7 Newton, or 0.7 Newton to 2 Newtons, or 0.7 Newton to 1.5 Newtons, or 0.9 Newton to 1.3 Newtons, or 1 Newton to 1.2 Newtons, or 0.95 Newtons to 1.15 Newtons. Alternatively, the heat-shrinkable film can have, after shrinking against the product, a tear propagation In an embodiment, the heat-shrinkable film has, after shrinking, an Elmendorf tear strength of at least 0.7 Newton ("N"), or 0.7 N to 2 N, or 0.7 N to 1.5 N, or 0.9 N to 1.3 N, or 1 N to 1.2 N, or 0.95 N to 1.15 N.

In an embodiment, the heat-shrinkable multilayer film exhibits a Peak Load Impact Strength, determined using ASTM D 3763-95A, of at least 50 Newtons per mil; in another embodiment from 50 to 250 Newtons per mil. Peak Load Impact Strength is measured using ASTM D 3763-95A, which is hereby incorporated, in its entirety, by reference thereto.

In an embodiment, the multilayer film has a total thickness, before shrinking, of from 1 to 10 mils, or 1.5 to 5 mils.

In an embodiment, no layer of the multilayer heat-shrinkable film comprises an incompatible polymer blend. In another embodiment, one or more layers of the multilayer film comprise an incompatible polymer blend.

Incompatible polymer blends include, but are not limited to, the following: (A) a blend of from 90 to 30 weight percent ethylene homopolymer and/or ethylene/alpha-olefin copolymer with from 10 to 70 weight percent ethylene/unsaturated ester copolymer having an unsaturated ester content of at least 10 weight percent; (B) a blend of ionomer resin with ethylene/unsaturated ester copolymer, and/or polybutylene, and/or propylene homopolymer and/or propylene copolymer; (C) a blend of homogeneous ethylene/alpha-olefin copolymer with recycled polymer blend comprising ethylene homopolymer, propylene homopolymer, ethylene copolymer, propylene copolymer, polyamide, ethylene/vinyl alcohol copolymer, ionomer resin, anhydride-modified ethylene/alpha-olefin copolymer, and/or antiblock; (D) a blend of from 10 to 75 weight percent ethylene/unsaturated ester copolymer with from 90 to 15 weight percent polypropylene and/or propylene/ethylene copolymer, and/or polybutylene, and/or modified ethylene/alpha-olefin copolymer, and/or styrene homopolymer, and/or styrene/butadiene copolymer; (E) a blend of ethylene/norbornene copolymer with ethylene/unsaturated ester copolymer and/or polypropylene and/or polybutylene; (F) a blend of from 90 to 15 weight percent ethylene/alpha-olefin copolymer with from 10 to 75 weight percent polypropylene and/or polybutylene and/or ethylene/norbornene; (G) a blend of from 90 to 25 weight percent homogeneous propylene homopolymer and/or homogeneous propylene copolymer with from 10 to 75 weight percent homogeneous ethylene/alpha-olefin copolymer and/or ethylene/unsaturated ester copolymer; (H) a blend of propylene homopolymer and/or propylene/ethylene copolymer and/or polybutylene with ethylene/methyl acrylate copolymer and/or ethylene/acrylic acid copolymer and/or ethylene/butyl acrylate copolymer; (I) a blend of polyamide with polystyrene and/or ethylene/alpha-olefin copolymer and/or ethylene/vinyl acetate copolymer and/or styrene/butadiene copolymer; and (J) a blend of polyamide 6 and polyamide 6I6T. Incompatible polymer blends are disclosed in U.S. Ser. No. 12/313,396, published as US 2009/0116768 A1, incorporated by reference above.

Tears through a first seal and thereafter tears along a second seal but not through the second seal.

FIG. 1 illustrates a schematic view of a first preferred process for making films according to the present invention. As illustrated in FIG. 1, solid polymer beads (not illustrated)

are fed to a plurality of extruders 28 (for simplicity, only one extruder is illustrated). Inside extruders 28, the polymer beads are forwarded, melted, and degassed, following which the resulting bubble-free melt is forwarded into die head 30, and extruded through an annular die, resulting in tubing 32 which is preferably about 10 to 20 mils thick.

After cooling or quenching by water spray from cooling ring 34, tubing 32 is collapsed by pinch rolls 36, and is thereafter fed through irradiation vault 38 surrounded by shielding 40, where tubing 32 is irradiated with high energy electrons (i.e., ionizing radiation) from iron core transformer accelerator 42. Tubing 32 is guided through irradiation vault 38 on rolls 44. Preferably, tubing 32 is irradiated to a level of from about 40 kGy to about 120 kGy.

After irradiation, irradiated tubing 46 is directed through pinch rolls 48, following which irradiated tubing 46 is slightly inflated, resulting in trapped bubble 50. However, at trapped bubble 50, the tubing is not significantly drawn longitudinally, as the surface speed of nip rolls 52 are about the same speed as nip rolls 48. Furthermore, irradiated tubing 46 is inflated only enough to provide a substantially circular tubing without significant transverse orientation, i.e., without stretching.

Slightly inflated, irradiated tubing 46 is passed through vacuum chamber 54, and thereafter forwarded through coating die 56. Annular coating stream 58 is melt extruded from coating die 56 and coated onto slightly inflated, irradiated tube 50, to form two-ply tubular film 60. Coating stream 58 preferably comprises an $O_2$-barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 60 is wound up onto windup roll 62. Thereafter, windup roll 62 is removed and installed as unwind roll 64, on a second stage in the process of making the tubing film as ultimately desired. Two-ply tubular film 60, from unwind roll 64, is unwound and passed over guide roll 66, after which two-ply tubular film 60 passes into hot water bath tank 68 containing hot water 70. The now collapsed, irradiated, coated tubular film 60 is immersed in hot water 70 (preferably, having temperature of about 185° F. to 210° F.) for a period of from about 10 to about 100 seconds, i.e., for a time period in order to bring the film up to the desired temperature for biaxial orientation. Thereafter, irradiated tubular film 60 is directed through nip rolls 72, and bubble 74 is blown, thereby transversely stretching tubular film 60.

Furthermore, while being blown, i.e., transversely stretched, nip rolls 76 draw tubular film 60 in the longitudinal direction, as nip rolls 76 have a surface speed higher than the surface speed of nip rolls 72. As a result of the transverse stretching and longitudinal drawing, irradiated, coated biaxially-oriented blown tubing film 78 is produced, this blown tubing preferably having been both stretched in a ratio of from about 1:1.5 to about 1:6, and drawn at a ratio of from about 1:1.5 to about 1:6; more preferably, the stretching and drawing are each performed a ratio of from about 1:2 to about 1:4. The result is a biaxial orientation of from about 1:2.25 to about 1:36, more preferably, from about 1:4 to about 1:16. While bubble 74 is maintained between pinch rolls 72 and 76, blown tubing 78 is collapsed by rollers 80, and thereafter conveyed through pinch rolls 76 and across guide roll 82, and then rolled onto wind-up roll 84. Idler roll 86 assures a good wind-up.

Figure 2:
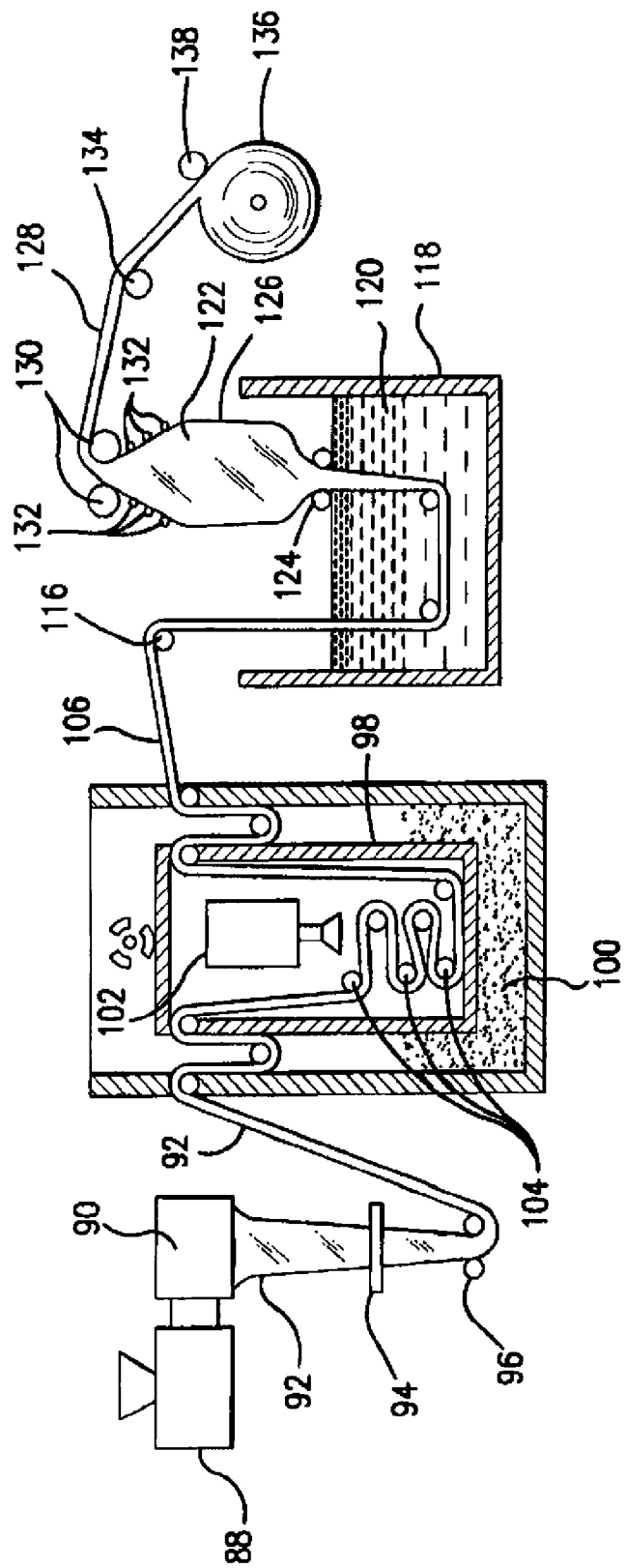
FIG. 2 is a schematic of an alternative preferred process for making a heat-shrinkable film for use in packaging article according to the invention.

FIG. 2 illustrates a schematic of a second preferred process for making a film in accordance with the present invention. In FIG. 2, solid polymer beads (not illustrated) are fed to a plurality of extruders (for simplicity, only extruder 88 is illustrated). Inside extruders 88, the polymer beads are forwarded, melted, and degassed, following which the resulting bubble-free melt is forwarded into die head 90, and extruded through an annular die, resulting in tubing tape 92 which is preferably from about 10 to 20 mils thick, and preferably has a lay-flat width of from about 2 to 10 inches.

After cooling or quenching by water spray from cooling ring 94, tubing tape 92 is collapsed by pinch rolls 96, and is thereafter fed through irradiation vault 98 surrounded by shielding 100, where tubing 92 is irradiated with high energy electrons (i.e., ionizing radiation) from iron core transformer accelerator 102. Tubing 92 is guided through irradiation vault 98 on rolls 104. Preferably, tubing 92 is irradiated to a level of from about 40 to about 120 kGy, resulting in irradiated tubing 106, which is then passed over guide roll 116, after which irradiated tubing 106 is passed into and through hot water bath tank 118 containing hot water 120.

Irradiated tubing 106 is immersed in hot water 120 (preferably having a temperature of about 185° F. to about 210° F.) for a period of about 10 to about 100 seconds, i.e., for a time period long enough to bring the film up to the desired temperature for biaxial orientation. Thereafter, the resulting hot, irradiated tubing 122 is directed through nip rolls 124, and bubble 126 is blown, thereby transversely stretching hot, irradiated tubular tubing 122 so that an oriented film tube 128 is formed.

Furthermore, while being blown, i.e., transversely stretched, nip rolls 130 have a surface speed higher than the surface speed of nip rolls 124, thereby resulting in longitudinal orientation. As a result of the transverse stretching and longitudinal drawing, oriented film tube 128 is produced, this blown tubing preferably having been both stretched at a ratio of from about 1:1.5 to about 1:6, and drawn at a ratio of from about 1:1.5 to about 1:6. More preferably, the stretching and drawing are each performed at a ratio of from about 1:2 to about 1:4. The result is a biaxial orientation of from about 1:2.25 to about 1:36, more preferably, from about 1:4 to about 116. While bubble 126 is maintained between pinch rolls 124 and 130, oriented film tube 128 is collapsed by rollers 132, and thereafter conveyed through pinch rolls 130 and across guide roll 134, and then rolled onto wind-up roll 136. Idler roll 138 assures a good wind-up. This process can be carried out continuously in a single operation, or intermittently, e.g., as a two-stage process, in which the extruded, irradiated tape is wound up after irradiation, and, after a period of storage, unwound and subjected to heating and orienting in order to arrive at oriented film tubing 128.

Figure 3:
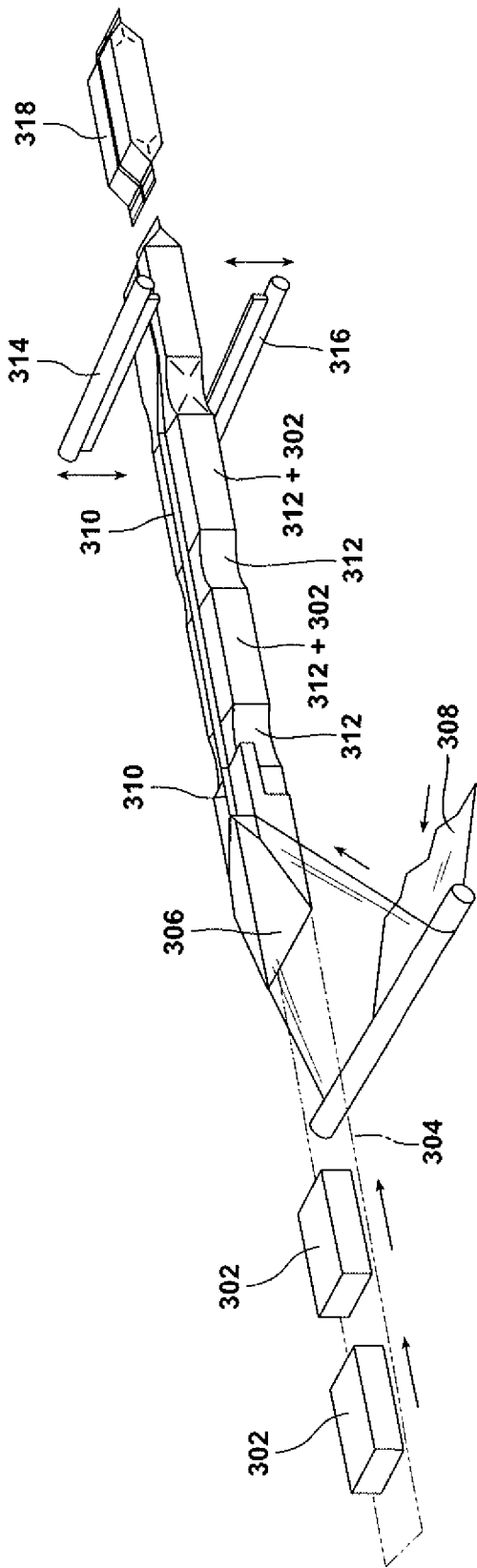
FIG. 3 is a schematic of a horizontal form fill and seal packaging process for use in making a packaged product including the packaging article of the invention.

Referring to FIG. 3, the heat-shrinkable film of Table 1 (below) is used for the packaging of products 302 using a horizontal form fill seal apparatus to make a pillow pack. Although product 302 can be any product to be packaged, a preferred product is a meat product, such as a roast, steak, chops, ribs, etc. Each product 302 can be an individual piece of meat or a set comprising a plurality of pieces of meat.

Product 302 to be packaged is forwarded on conveyor 304, with a pusher (not shown) pushing product 302 into and through forming horn 306. Continuous strand of film 308 (supplied from a roll of film, not illustrated) is forwarded to, under, around, over, and past forming horn 306 as a stream of products 302 passes through forming horn 306. Products 302 are forwarded through forming horn 306 at the same speed that film 308 passes around and past forming horn 306.

Film 308 is folded as it passes around and over forming horn 306, so that as product 302 emerges from forming horn 306, film 308 is folded around product 302, with product 302 now being inside a tube 312 of film 309. Above forming shoe 306, the edges of film 308 are folded upward and a sealing apparatus (not illustrated) forms a continuous fin-type heat seal 310 along the upwardly folded longitudinal edges of film 308, as products 302 continue to be forwarded (on a conveyor, not illustrated) while inside the tubing 312 which has been formed from film 308.

The stream of products 302 and film tubing 312 are together forwarded to a transverse sealer and cutter including upper sealer/cutter member 314 and lower sealer/cutter member 316, which work together to make transverse seals between products 302, and to cut film tubing 312 apart to produce individual, closed, packaged products 318 after each package has been sealed closed. Upper and lower sealer/cutter bars 312, 314 oscillate upward and downward as film tubing 312 is forwarded. Upon being sealed closed and cut free of the tubing, the result is packaged product 318. The heat-shrinkable film portion of packaged product 318 is then shrunk tight against product 302 by passing packaged product 318 through a hot air tunnel or through a hot water bath.

If it is desired that the atmosphere is evacuated from the packages, the form film seal process can be conducted in an evacuated chamber (not illustrated). Products 304 can be forwarded into an upstream end of antechamber which is periodically closed and atmosphere evacuated so that the products therein can thereafter enter the form fill seal process without atmosphere and be packaged while under vacuum, resulting in enhanced shelf life and a tighter package after shrinking. Vacuum packaging can also be achieved by leaving one end of the package open and placing the open package in a vacuum chamber to evacuate atmosphere from within the package and closing the package by making the third seal while the package remains under vacuum.

Figure 4:
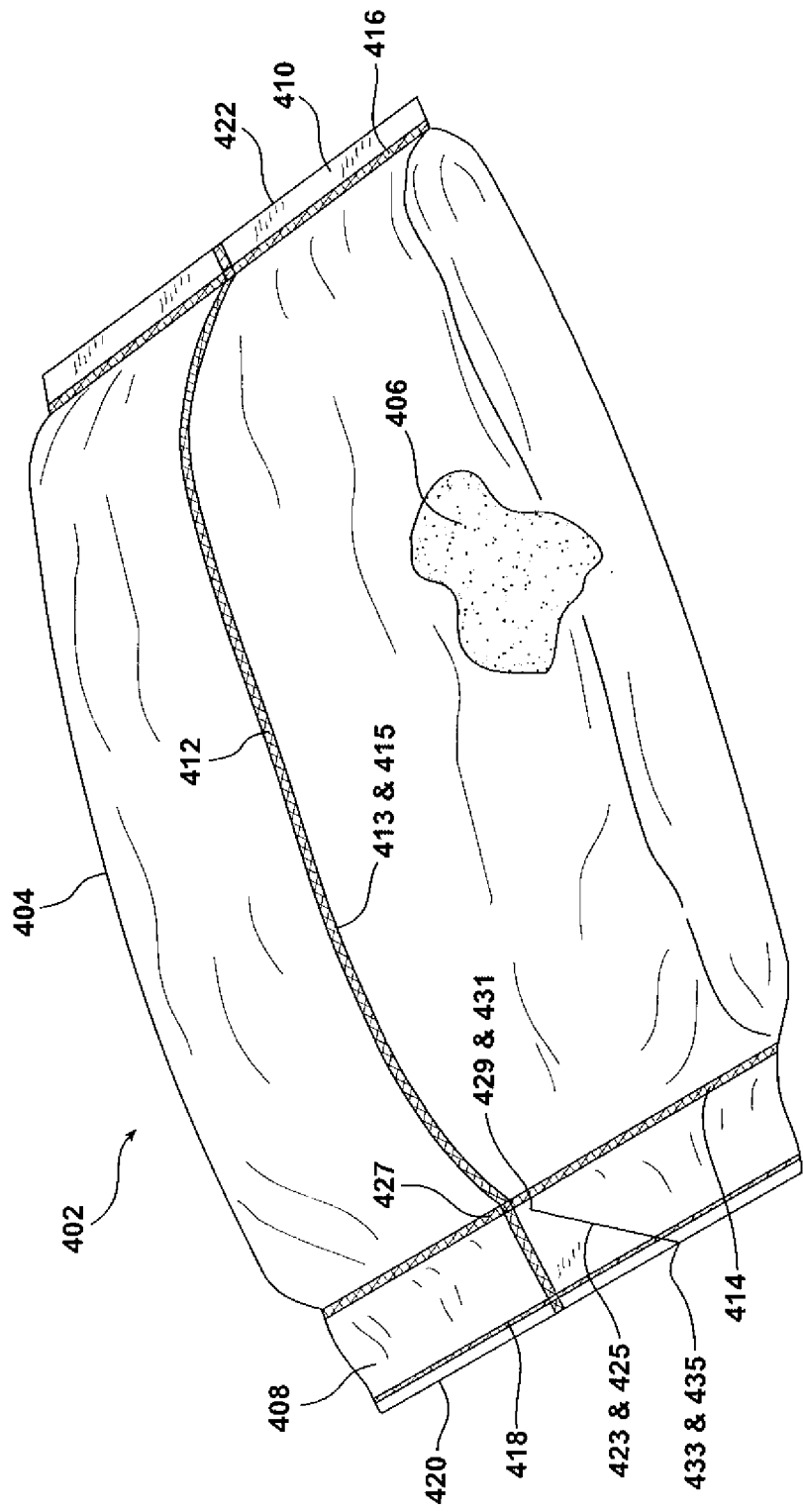
FIG. 4 is a perspective view of a product packaged in the packaging article of the invention.

Upper and lower sealer/cutter members 314, 316 can also be designed to make the packaged products in accordance with package 402 of FIG. 4, in that extra an extra transverse seal 404 can be made, as well cutting tear initiation slit 406 (see FIG. 4) by providing sealer/cuter members 314, 316 with a cutter for making tear initiation slit 406.

Packaged product 402 (see FIG. 4) is a member of a general package type known as a pillow package. FIG. 4 illustrates a perspective view of a preferred packaged product 402 in which packaging article 404 surrounds product 406. Packaging article 404 is made from a heat-shrinkable film that is sealed in the machine direction to form a tubing having the product inside, and thereafter sealed transversely and shrunk around the product while the atmosphere is evacuated from within the package, as described above.

Packaging article 404 has first skirt 408 extending outward from a first end of product 406, and second skirt 410 extending outward from a second end of product 406. Packaging article 404 has longitudinal heat seal 412 running the length of the package, with longitudinal heat seal 412 running in the machine direction, i.e., the direction of film manufacture. Longitudinal heat seal 412 is a fin seal, with aligned first and second longitudinal film edges 413 and 415 being coincident with one another along longitudinal heat seal 412. Packaged product 402 has first transverse heat seal 414 inward of bottom edge 420 (i.e., bottom end 420) of packaging article 404, and second transverse heat seal 416 inward of top edge 422 (i.e., top end 422) of packaging article 404, and a third transverse heat seal 418 in first skirt 408, outward of first transverse heat seal 414 and inward of bottom edge 420.

First skirt 408 extends from first transverse heat seal 414 to bottom edge 420 of packaging article 404. Second skirt 410 extends from second transverse seal 416 to top edge 422 of packaging article 404. The heat shrinkable film is wrapped around product 406 with the film tubing being longer than product 406. As a result, first skirt 408 consists of two components, i.e., an upper film skirt which extends outward from that portion of the film covering the top of product 406, and a lower film skirt which extends outward from that portion of the film covering the bottom surface of product 406. The upper film skirt is sealed to the lower film skirt at first transverse heat seal 414 and third transverse heat seal 418. Similarly, second skirt 410 consists of these two components: an upper film skirt which extends outward from that portion of the film covering the top of product 406, and a lower film skirt which extends outward from that portion of the film covering the bottom surface of product 406. In second skirt 410, as with first skirt 408, the upper film skirt is heat sealed to the lower film skirt at second transverse heat seal 416.

First skirt 408 can be wider than would normally the be case for a pillow package, and wider than second skirt 410, as first skirt 408 is provided with coincident first and second tear initiators 423 & 425 (i.e., directly on top of one another). The first tear initiator 423 is a slit through the upper film skirt of first skirt 408, and the second tear initiator 425 is a slit through the lower skirt of first skirt 408. As first and second tear initiator slits 423 & 425 through the upper and lower film skirts are coincident with one another, i.e., directly over one another, and of substantially the same size and position relative to longitudinal seal 412 and first transverse seal 414, both first and second tear initiator slits 423 & 425 are designated with a single lead line in FIG. 4.

Tear initiators 423 & 425 are straight slits extending inwardly into the packaging article 404 and toward longitudinal seal 412. Tear initiators 423 & 425 are positioned at an angle of about 45 degrees with respect to longitudinal seal 412 as well as 45 degrees with respect to first transverse seal 414. Tear initators 423 & 425 pass through third transverse heat seal 418, extending outward to bottom edge 420 of packaging article 404. Tear initiators 423 & 425 extend inward along a line towards the intersection of longitudinal heat seal 412 and first transverse heat seal 414, with tear initiators 422 terminating about 10 millimeters from intersection 427 of longitudinal heat seal 412 and first transverse heat seal 414. Tear initiators 423 & 425 have inward ends 429 and 431, respectively, and outward ends 433 and 435, respectively. Inward ends 429 and 431 are approximately 7 millimeters from longitudinal heat seal 412 and about 7 millimeters from first transverse heat seal 414, each of these distances being the closest point along the heat seal to the inward ends of the tear initiators.

Longitudinal heat seal 412, first transverse heat seal 414, second transverse heat seal 416, and third transverse heat seal 118, are all hermetic heat seals of the inside surface of the film to itself. Each of these heat seals is of a type generally referred to as a "fin seal". While longitudinal heat seal 412 is described above as a fin seal with aligned first and second longitudinal edges 413 and 415, in an alternative embodiment (not illustrated), longitudinal heat seal 412 could be a hermetic heat seal of the outside surface of the film to the inside surface of the film, i.e., a seal of a type known as a "lap seal."

The film is puckered, i.e., not smooth, throughout first skirt 408 and second skirt 410. This is because the film has been shrunken by the application of heat from the heat sealing operation as well as heat from the packaged product being passed through a hot air tunnel or though a hot water bath to shrink the heat-shrinkable film tight against product 406.

Third transverse heat seal 418 serves to increase the stiffness of first skirt 408 and keeps the upper and lower portions of skirt 408 together during and after film shrinkage, particularly in the area of first and second tear initiators 423 & 425.

Third transverse heat seal 418 serves to make first skirt 408 less floppy and more coherent, thereby serving to make first and second tear initiators more readily visible and making first skirt 408 more readily graspable during manual tearing open of packaging article 404. Although third transverse heat seal 418 of FIG. 4 is a continuous seal across the full width of packaging article 404, in an alternative embodiment (not illustrated) third transverse heat seal is a set of discontinuous, discrete elongated heat seals, or a plurality of spot seals, which may extend only across a portion of the width of packaging article 404. Different seals or points of seal could be applied to first skirt 408, or air could be entrapped between the first and third transverse heat seals, to further improve both the grip during the pack opening and the pack appearance.

In an embodiment, at least a portion of first skirt 408 is heatset, so that upon forming the package and shrinking the film around the product, the shrinkage and curl of skirt 408 is reduced. In an embodiment, skirt 408 further comprises at least one grip assister for assisting grip of the multilayer film during manual tearing, as disclosed in Pub. No. US 2009/0116768 A1.

Figure 5:
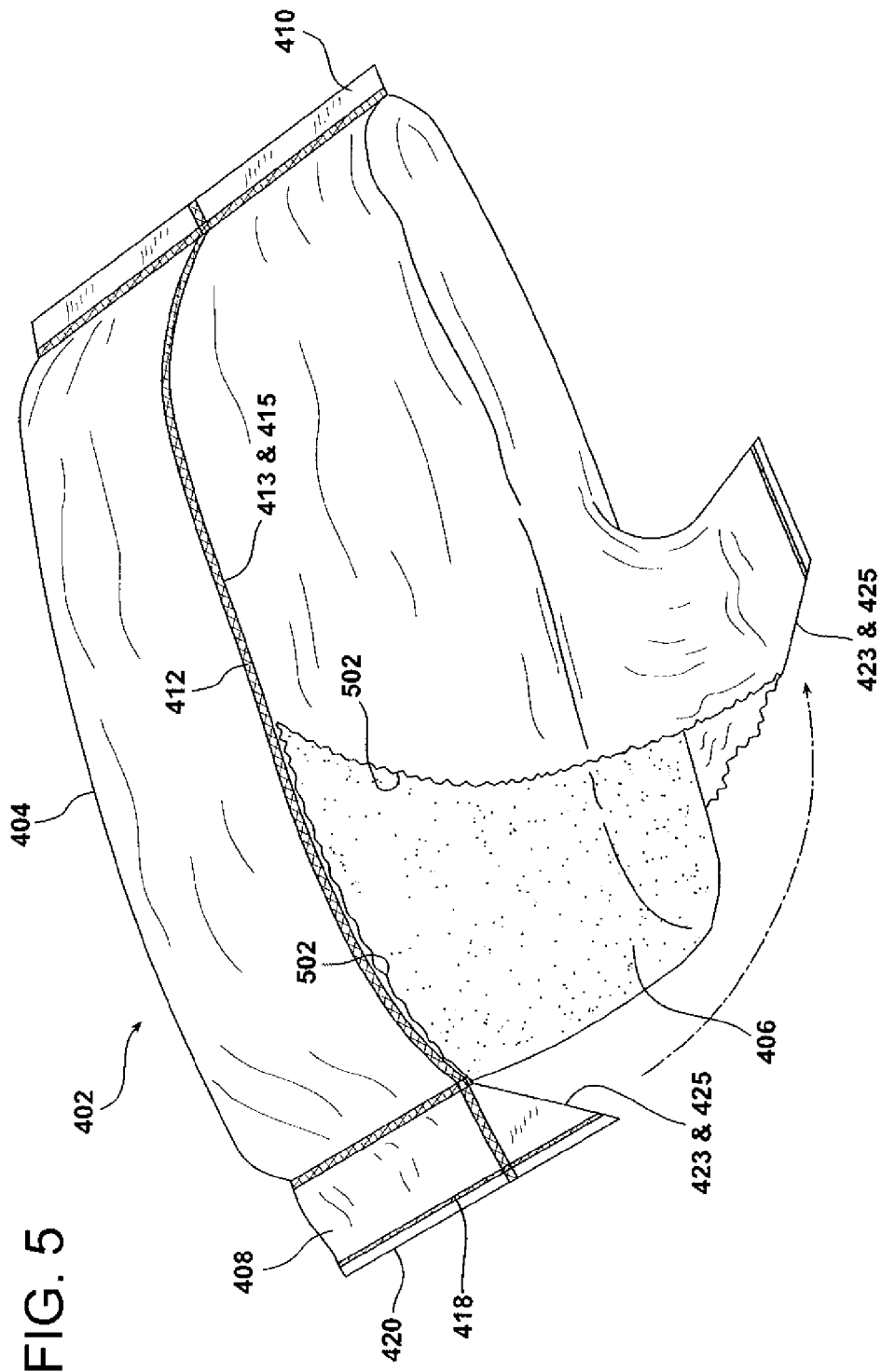
FIG. 5 is a perspective view of a product packaged in the packaging article of the invention, with the packaging article in the process of being manually torn open so that the product can be removed.

Although the heat-shrinkable film from which packaging article 404 is made is a tough film, packaging article 404 is designed to be opened using a manual tearing operation. FIG. 5 illustrates packaging article 404 in a state of being manually torn open from coincident tear initiators 423 and 425. As is apparent in FIG. 5, tear 502 runs along longitudinal heat seal 412, with tear 502 emanating from first and second tear initiators 423 & 425. Of course, longitudinal seal 412 is not present on the bottom side of packaging article 404. However, tears proceed simultaneously down the top and bottom sides of packaging article 404, resulting in the opening of packaging article 404 so that product 406 can be manually removed from packaging article 404 upon completion of tearing, without the use of a sharp implement such as a knife or scissors.

Manual tearing of the packaging article is carried out by holding tight the left side of the bag excess, with the longitudinal heat seal being in a vertical position with bottom edge 420 up, with the tear being made downwards along longitudinal seal 412. As illustrated, preferably tear initiators 423 and 425 are located on the left side of the first heat seal, i.e., for a right-handed individual to make the tear. A printed indication (not illustrated) can be provided to indicate to the consumer the tear direction to produce tear 502 down along longitudinal seal 412.

Figure 6:
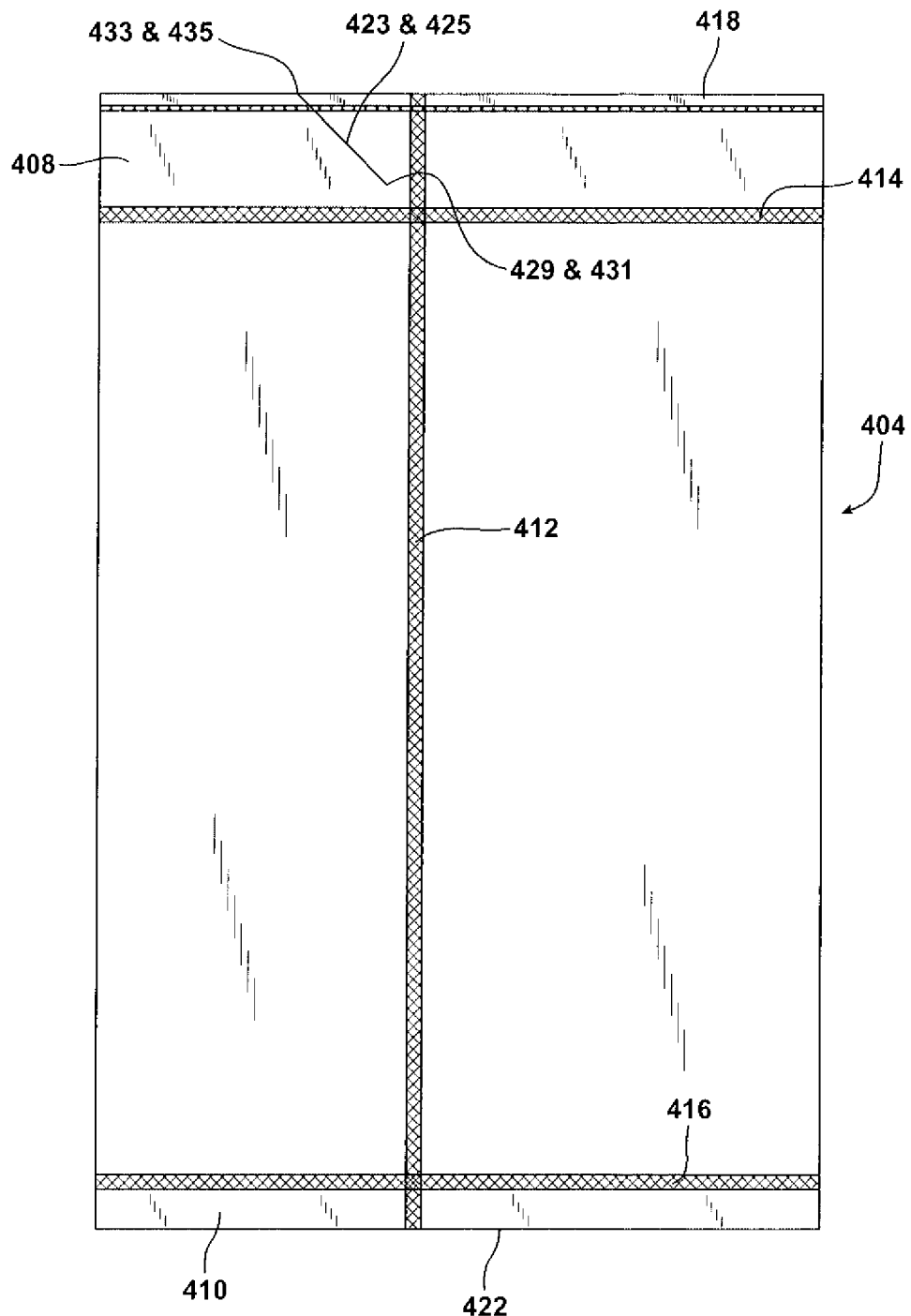
FIG. 6 is a schematic of the packaging article in lay-flat configuration without a product inside.

FIG. 6 is a schematic of packaging article 404 of FIG. 4, except that FIG. 6 illustrates packaging article 404 in lay-flat configuration, without a product inside, and before shrinking FIG. 6 illustrates longitudinal first heat seal 412, transverse second heat seal 414, transverse third heat seal 416, optional (but preferred) transverse fourth heat seal 418, and coincident tear initiators 423 a& 425, which are straight slits through both upper and lower portions of first skirt 408.

Figure 7:
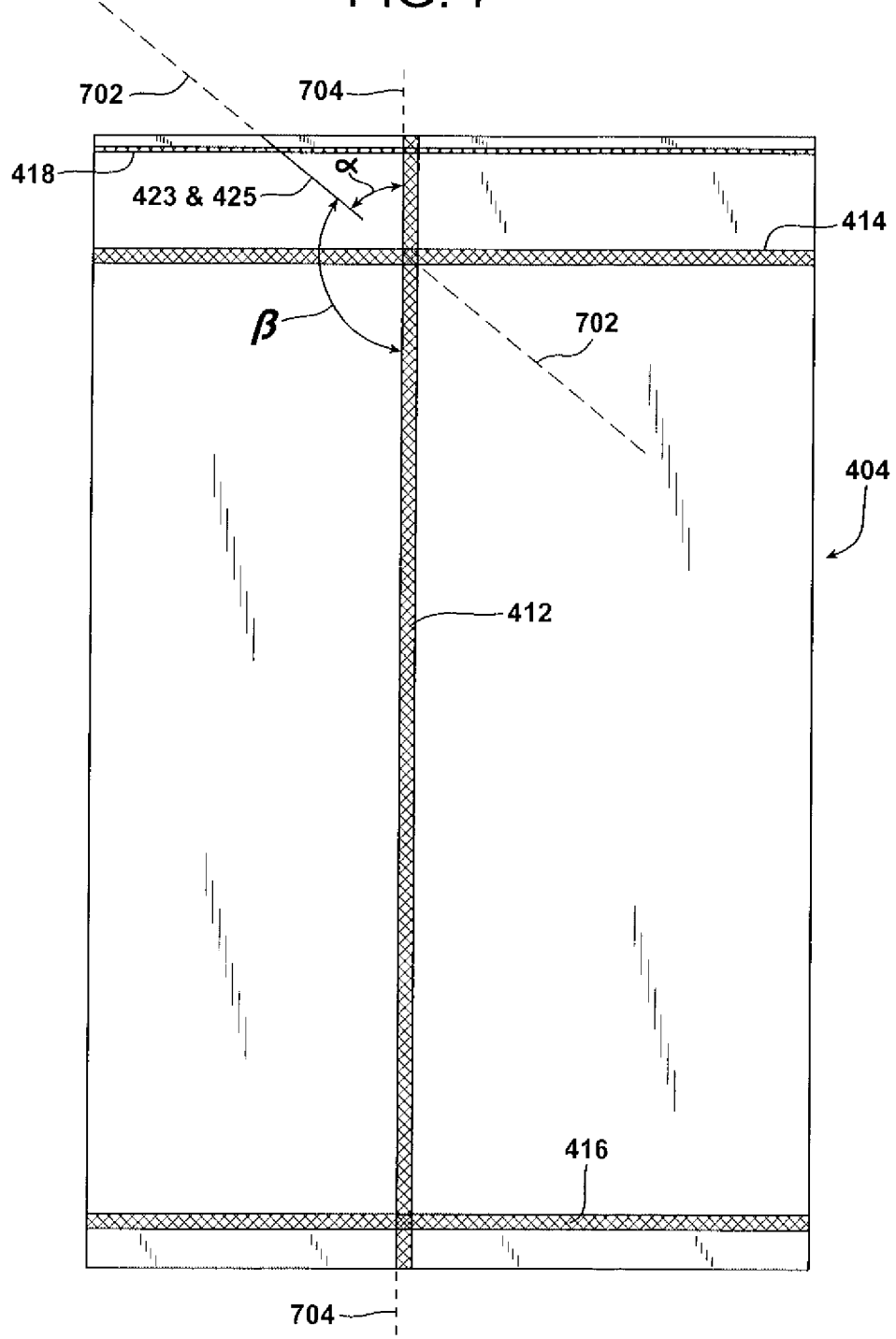
FIG. 7 is a schematic of the packaging article of FIG. 6, with added lines establishing the lesser included angle between the tear initiators and the first heat seal.

FIG. 7 is a schematic of the packaging article 404 of FIG. 6, with dashed line 702 passing through and extended from coincident tear initiators 423 & 425, and dashed line 704 passing through and extending from longitudinal first heat seal 412. Dashed lines 702 and 704 establish the angle between tear initiators 423 & 425 and first longitudinal first heat seal 412. The lesser included angle between lines 702 and 704 is represented by the symbol "α" in FIG. 7. As illustrated in FIG. 7, lesser included angle α is approximately 45 degrees. In contrast, the greater included angle between lines 702 and 704 is represented by the symbol "β" in FIG. 7. As illustrated in FIG. 7, greater included angle β is approximately 135 degrees.

FIG. 8 is a schematic of a first comparative packaging article 804 in lay-flat configuration without a product inside, before shrinking In FIG. 8, dashed line 802 passes through and extends from coincident tear initiators 823 & 825, and dashed line 808 passes through and extends from longitudinal first heat seal 412. The lesser included angle α between lines 802 and 808 is approximately 60 degrees. The greater included angle β is approximately 120 degrees. The tear initiators 823 and 825 of FIG. 8 did not perform as well as the tear initiators 423 and 825 of FIG. 7, in that more often tearing of the of FIG. 8 packaging article resulted in a transverse tear propagation across the packaging article just after the second transverse heat seal 414, or a breakage of a grip assister (not illustrated) before opening.

FIG. 9 is a schematic of a second comparative packaging article 904 in lay-flat configuration without a product inside, before shrinking In FIG. 9, dashed line 902 passes through and extends from coincident tear initiators 923 & 925, and dashed line 908 passes through and extends from longitudinal first heat seal 412. Line 902 is parallel to line 908, and as such there is a 0 degree lesser included angle (i.e., no lesser included angle) between lines 902 and 908. The tear initiators 923 & 925 of FIG. 9 did not perform as well as the tear initiators 423 and 425 of FIG. 7, in that more often tearing of the of FIG. 9 packaging article resulted in a transverse tear propagation across the packaging article just after the second transverse heat seal 414, or a breakage of a grip-assister (not illustrated) before opening.

FIG. 10 is a schematic of a third comparative packaging article 954 in lay-flat configuration without a product inside, before shrinking In FIG. 10, dashed line 952 passes through and extends from coincident tear initiators 953 & 955, and dashed line 958 passes through and extends from longitudinal first heat seal 412. Line 952 is parallel to line 958, and as such there is a 0 degree lesser included angle (i.e., no lesser included angle) between lines 952 and 958. Bracketing heat seals 957 and 959 are on each side of tear initiators 953 and 955, with bracketing heat seals 957 and 959 extending from first transverse heat seal 414 to third transverse heat seal 418. The tear initiators 953 & 955 of FIG. 10 did not perform as well as the tear initiators 422 of FIG. 7, in that the resulting manual tearing of the package after shrinking around a product does not produce a longitudinal tear along longitudinal first heat seal 412, all the way down the length of packaging article 954.

The invention is illustrated by the following example, which is provided for the purpose of representation, and are not to be construed as limiting the scope of the invention. Unless stated otherwise, all percentages, parts, etc. are by weight.

A preferred six-layer, heat-shrinkable multilayer film for use in making a packaging article according to the present invention was produced in a manner as illustrated in FIG. 2, described above. The composition of this film, referred to herein as Film No. 1, is described below and provided in Table 1. The first layer was an outer film layer that served as the outside layer of the bag. The second layer was a tie layer between the first layer and the third layer. The third layer was an $O_2$-barrier layer. The fourth layer was a tie layer. The fifth layer was a core layer. The sixth layer was an outer film layer that served as the inside layer of the packaging article and as a seal layer.

TABLE 1

| Layer Designation | Layer Chemical Identity | Layer Thickness (microns) |
|---|---|---|
| First (outside) | 100% Capron ® CA95 WP polyamide 6/66 | 2.8 |
| Second | 100% Admer ® NF 538E anhydride modified VLDPE | 8.4 |
| Third | 68% Ixan ® PV324 vinylidene chloride/vinyl chloride copolymer; 30% Ixan ® PV891 vinylidene chloride/methyl acrylate copolymer; 2% Drapex ® 392 expoxidzed soybean oil | 6.7 |
| Fourth | 100% Escorene ® FL 00014 Ultra EVA | 7.8 |
| Fifth | 20% Escorene ® FL 00014 Ultra EVA 80.0% Dowlex ® 2045S | 7.8 |
| Sixth (inside) | 100% Affinity ® PL 1280 | 14.5 |

The resins identified in Table 1 have the following properties:

Capron® CA95 WP polyamide 6/66: density 1.128 g/cc, melt point 196° C., obtained from BASF Corporation.

Admer® NF 538E anhydride modified very low density polyethylene: density 0.91 g/cc, melt index 4.1, obtained from Mitsui Chemicals America.

Ixan® PV 324 vinylidene chloride/vinyl chloride copolymer: density 1.68 g/cc, 21-24 wt. % vinyl chloride, obtained from Solvay Plastics.

Ixan® PV 891 vinylidene chloride/methyl acrylate copolymer: density 1.73 g/cc, methyl acrylate 8.1 wt. %, obtained from Solvay Plastics.

Drapex® 392 expoxidzed soybean oil: density of 0.995 g/cc, obtained from Chemtura Corporation.

Escorene® FL 00014 Ultra ethylene/vinyl acetate copolymer: density of 0.937 g/cc, vinyl acetate content of 14 wt %, melt index 0.25 g/10 min, melt point 91° C., obtained from ExxonMobil Chemical.

Dowlex® 2045S linear low density polyethylene: Ziegler Natta catalyzed, heterogeneous ethylene/octene copolymer, density of 0.92 g/cc, melt index 1.0 g/10 min, melt point 124° C., obtained from The Dow Chemical Company.

Affinity® PL 1280 substantially linear, single site catalyzed ethylene/octene copolymer: 0.900 g/cc, melt index 6.0 g/10 min, melt point 99° C., obtained from The Dow Chemical Company.

The heat-shrinkable film had a total thickness of 45 microns. The film exhibited a free shrink at 85° C. (=185° F.) of 27% in the machine direction and 33% in the transverse direction. The film exhibited a tensile strength of 750 Kg/cm$^2$ in the machine direction and 460 Kg/cm$^2$ in the transverse direction. The film exhibited a tear initiation of 550 grams in the machine direction and 680 grams in the transverse direction. The film exhibited exhibited a tear propagation of 110 grams in the machine direction and 200 grams in the transverse direction.

The heat-shrinkable film tubing was slit wound onto a roll, which was unwound and supplied to a process as illustrated in FIG. 3, as described above, to make a packaging article and packaged product in accordance with FIG. 4. The resulting packaging article was torn open manually, as illustrated in FIG. 5, with the lengthwise tear proceeding along the longitudinal first heat seal.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

What is claimed is:

1. A flexible packaging article comprising a heat-shrinkable multilayer film having an outside surface and an inside surface, a top edge, a bottom edge, a first longitudinal edge, and a second longitudinal edge, the packaging article having an internal volume for containing a product to be packaged, the packaging article further comprising:
   (A) (i) a first heat seal extending along the first and second longitudinal edges from the top edge to the bottom edge down a length of the packaging article, the first heat seal being a heat seal of (a) a first region of the inside surface to a second region of the inside surface, or (b) the first region of the inside surface to a first region of the outside surface;
      (ii) a second heat seal extending across a width of the packaging article and providing a bottom of the internal volume, the second heat seal being a heat seal of a third region of the inside surface to a fourth region of the inside surface, the second heat seal crossing the first heat seal, and
      (iii) a third heat seal extending across the width of the packaging article and providing a top of the internal volume, the third heat seal being a heat seal of a fifth region of the inside surface to a sixth region of the inside surface, the third heat seal also crossing the first heat seal;
      (iii) a skirt between the second heat seal and the bottom edge, the skirt being outward of the second heat seal; and
   (B) first and second tear initiators in the skirt, the first tear initiator comprising a first cut through the skirt, and the second tear initiator comprising a second cut through the skirt, with each of the first and second tear initiators having an inward end and an outward end, with the inward end being closer to both the first heat seal and the second heat seal than the outward end, and the outward end being closer to the bottom edge than the inward end, with the first and second tear initiators being positioned relative to the first heat seal so that a superimposed straight line extending through the inward and outward ends of each tear initiator intersects a superimposed straight line extending through the ends of the first heat seal at a lesser included angle of from 25 degrees to 55 degrees, with the inward end of each of the first and second tear initiators terminating at a location which is from 3 to 30 millimeters from the first heat seal and 3 to 50 millimeters from the second heat seal, and wherein the heat shrinkable film exhibits an Elmendorf tear strength in a machine direction of from 0.7N to 2N before shrinking.

2. The packaging article according to claim 1, wherein the multilayer film is free of any score line that weakens the film along a tear line extending from the first tear initiator or along a tear line extending from the second tear initiator.

3. The packaging article according to claim 1, wherein the tear initiators are positioned so that a tear extending therefrom passes through the second heat seal but not through part or all of the first heat seal.

4. The packaging article according to claim 1, wherein the second seal is a curved seal.

5. The packaging article according to claim 1, wherein no portion of the film is sealed to itself along film edges defining the first and second tear initiators.

6. The packaging article according to claim 1, further comprising a fourth heat seal of a seventh region of the inside surface to an eighth region of the inside surface, the forth heat seal being in the skirt.

7. The packaging article according to claim 6, wherein the third heat seal extends across a full width of the packaging article.

8. The packaging article according to claim 1, wherein the first heat seal is a heat seal of first and second regions of the inside surface to itself.

9. The packaging article according to claim 1, wherein the first and second tear initiators are coincident with one another.

10. The packaging article according to claim 1, wherein the outward ends of the first and second tear initiators are on the bottom edge.

11. The packaging article according to claim 1, wherein the first heat seal is a straight heat seal and the second heat seal is a straight heat seal.

12. The packaging article according to claim 1, wherein the superimposed straight line extending through the inward and outward ends of each tear initiator intersects the superimposed straight line extending through the ends of the first heat seal at a lesser included angle of from 35 degrees to 55 degrees, and the inward end of each of the first and second tear initiators terminates at a location which is from 5 to 20 millimeters from the first heat seal and 5 to 40 millimeters from the second heat seal.

13. The packaging article according to claim 12, wherein the superimposed straight line extending through the inward and outward ends of each tear initiator intersects the superimposed straight line extending through the ends of the first heat seal at a lesser included angle of from 40 degrees to 50 degrees, and the inward end of each of the first and second tear initiators terminates at a location which is from 7 to 15 millimeters from the first heat seal and 7 to 30 millimeters from the second heat seal.

14. The packaging article according to claim 1, wherein the first tear initiator is a straight slit and the second tear initiator is a straight slit.

15. The packaging article according to claim 1, wherein the first tear initiator is a notch and the second tear initiator is a notch.

16. The packaging article according to claim 1, wherein the multilayer film comprises a seal layer, an oxygen barrier layer, an outer skin layer, a first tie layer between the seal layer and the barrier layer, and a second tie layer between the barrier layer and the outer skin layer.

17. The packaging article according to claim 1, wherein the film has a total free shrink at 85° C. of from 20 percent to 120 percent.

18. The packaging article according to claim 1, wherein the first heat seal is of a first region of the inside surface to a first region of the outside surface.

19. The packaging article according to claim 1, wherein no layer of the multilayer film comprises an incompatible polymer blend.

20. The packaging article according to claim 1, wherein the film exhibits a peak load impact strength of at least 50 Newtons per mil.

* * * * *